(12) United States Patent
Hohmann et al.

(10) Patent No.: US 9,623,524 B2
(45) Date of Patent: Apr. 18, 2017

(54) TENSIONING DEVICE FOR EXPANDING A THREADED BOLT

(71) Applicant: ITH GmbH & Co. KG, Meschede (DE)

(72) Inventors: Jörg Hohmann, Meschede (DE); Frank Hohmann, Warstein (DE)

(73) Assignee: ITH GmbH & Co. KG, Meschede (DE)

(*) Notice: Subject to any disclaimer, the term of this patent is extended or adjusted under 35 U.S.C. 154(b) by 279 days.

(21) Appl. No.: 14/324,106

(22) Filed: Jul. 4, 2014

(65) Prior Publication Data

US 2015/0013502 A1    Jan. 15, 2015

(30) Foreign Application Priority Data

Jul. 5, 2013  (DE) .................. 10 2013 107 096

(51) Int. Cl.
*B23P 19/06* (2006.01)
*B25B 21/00* (2006.01)
*B25B 29/02* (2006.01)

(52) U.S. Cl.
CPC .......... *B23P 19/067* (2013.01); *B25B 21/002* (2013.01); *B25B 29/02* (2013.01)

(58) Field of Classification Search
CPC ..... B23P 19/067; B25B 21/002; B25B 29/02; B25B 23/00
See application file for complete search history.

(56) References Cited

U.S. PATENT DOCUMENTS

| 2,885,919 | A |   | 5/1959 | Carlson |                      |
|-----------|---|---|--------|---------|----------------------|
| 3,015,975 | A |   | 1/1962 | Biach   |                      |
| 3,877,326 | A | * | 4/1975 | Kock et al. | ............. B25B 29/02 |
|           |   |   |        |         | 81/57.38             |
| 4,273,011 | A | * | 6/1981 | Exner   | ..................... B25B 29/02 |
|           |   |   |        |         | 81/57.38             |
| 4,314,690 | A | * | 2/1982 | Mlynarik | ................ B25B 29/02 |
|           |   |   |        |         | 254/29 A             |
| 5,452,629 | A | * | 9/1995 | Heiermann | ........... B23P 19/067 |
|           |   |   |        |         | 254/29 A             |
| 7,062,998 | B2| * | 6/2006 | Hohmann | ............... B25B 29/02 |
|           |   |   |        |         | 81/429               |

(Continued)

FOREIGN PATENT DOCUMENTS

DE    19638901 A1    3/1998
WO    99/46089       9/1999

*Primary Examiner* — David B Thomas
(74) *Attorney, Agent, or Firm* — Gudrun E. Huckett

(57) ABSTRACT

In a tensioning device for expanding a threaded bolt by a pull on its threaded end portion, a supporting tube surrounds the threaded end portion and a nut is screwed onto the threaded end portion. A cylinder is arranged in the prolongation of the supporting tube and has at least one piston movable therein in the longitudinal direction and connectable to a hydraulic supply. An interchangeable bush is screwable to the threaded end portion and is drivable axially by the piston. A gear arrangement for adjusting the nut is provided. Components of the gear arrangement are a driver element engaging externally on the nut and a drive shaft provided with an engagement structure for a drive tool. In this case, the axis of rotation of the drive shaft is arranged at an angle of preferably 90° to the longitudinal mid-axis of the piston.

12 Claims, 2 Drawing Sheets

(56) References Cited

U.S. PATENT DOCUMENTS

| | | | | |
|---|---|---|---|---|
| 7,338,240 B2* | 3/2008 | Hohmann | ............... | B25B 29/02 411/14.5 |
| 7,469,592 B2* | 12/2008 | Hohmann | ............. | B23P 19/067 73/761 |
| 7,513,178 B2* | 4/2009 | Hohmann | ............... | B25B 29/02 81/57.14 |
| 7,661,336 B2* | 2/2010 | Hohmann | ............. | B23P 19/067 254/29 A |
| 8,266,781 B2* | 9/2012 | Bucknell | ............. | B23P 19/067 29/446 |
| 8,302,509 B2* | 11/2012 | Hohmann | ............. | B23P 19/067 73/761 |
| 8,375,554 B2* | 2/2013 | Wagner | .................. | B23P 11/00 29/525.11 |
| 8,616,094 B2* | 12/2013 | Hohmann | ............. | B23P 19/067 29/452 |
| 9,248,532 B2* | 2/2016 | Wagner | ................. | B23P 19/067 81/57.38 |
| 2008/0006122 A1 | 1/2008 | Hohmann et al. | | |
| 2008/0034925 A1* | 2/2008 | Hohmann | ............. | B23P 19/067 81/57.38 |
| 2008/0173140 A1* | 7/2008 | Hohmann | ............. | B23P 19/067 81/57.44 |
| 2008/0301926 A1* | 12/2008 | Bucknell | ............... | B23P 19/067 29/452 |
| 2009/0013518 A1 | 1/2009 | Monville | | |
| 2010/0175240 A1* | 7/2010 | Wagner | ................. | B23P 19/067 29/407.08 |
| 2011/0048176 A1* | 3/2011 | Hohmann | ............. | B23P 19/067 81/57.38 |
| 2011/0188960 A1* | 8/2011 | Hohmann | ............. | B23P 19/067 411/14.5 |
| 2011/0271798 A1* | 11/2011 | Wagner | ................... | B25B 29/02 81/57.38 |
| 2013/0008015 A1* | 1/2013 | Junkers | ................. | B23P 19/067 29/525.02 |
| 2014/0165789 A1* | 6/2014 | Hohmann | ............... | B25B 29/02 81/57.38 |
| 2014/0245868 A1* | 9/2014 | Wagner | ................... | B25B 29/02 81/57.38 |

* cited by examiner

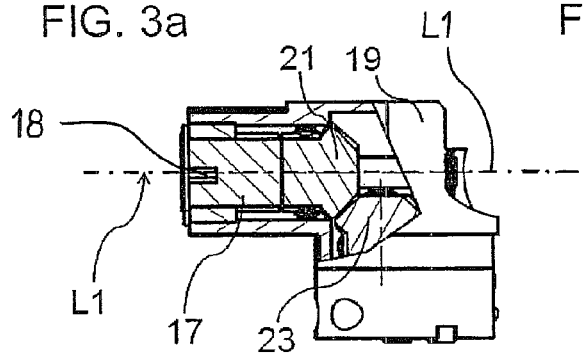
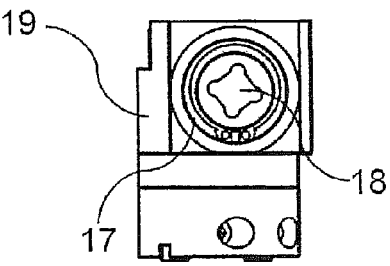
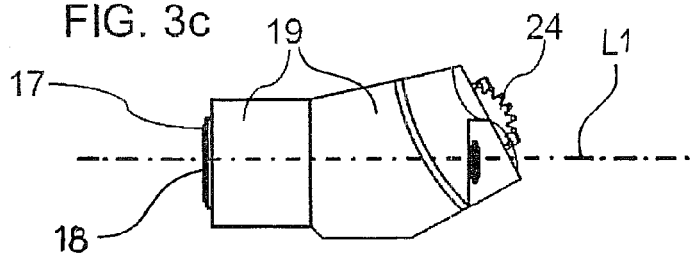
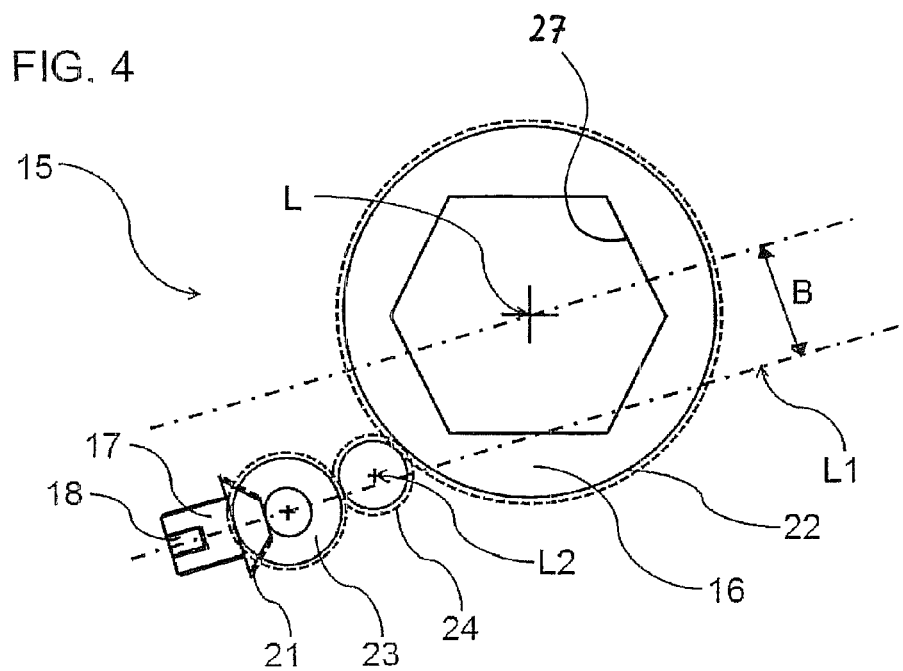

TENSIONING DEVICE FOR EXPANDING A THREADED BOLT

BACKGROUND OF THE INVENTION

The invention relates to a tensioning device for expanding a threaded bolt by a pull on its threaded end portion, with a supporting tube surrounding the threaded end portion and a nut screwed onto the threaded end portion, with a cylinder arranged in the prolongation of the supporting tube and having at least one piston movable therein in the longitudinal direction and connectable to a hydraulic supply, with an interchangeable bush screwable to the threaded end portion and designed to be drivable axially by the piston, and with a gear arrangement for adjusting the nut, components of the gear arrangement being a driver element engaging externally on the nut and a drive shaft provided with an engagement structure for a drive tool.

Bolt-tensioning devices of this type, such as are known, for example, from US 2008/0006122 A1 and WO 99/46089, serve for the tightening and, where appropriate, also the loosening of highly loaded screw connections composed of a threaded bolt and of a nut. The tensioning device has the task of applying a stipulated prestressing force to the threaded bolt for a certain time in the bolt longitudinal direction by means of a hydraulically actuated piston, in order thereby to create the possibility of tightening or retightening or also of loosening, free of torque, the nut which is screwed onto the threaded bolt. To rotate the nut, a gear with an engagement structure for an external drive tool is arranged laterally on the housing of the tensioning device. After the external drive tool has been attached, this is rotated about an axis of rotation which is arranged parallel to the longitudinal mid-axis of the piston. In practice, particularly in the case of threaded bolts arranged closely next to one another, situations often arise where the available space is not sufficient for the tensioning device, including the gear fastened laterally to it, or the engagement structure of the gear is in such an awkward location that a suitable drive tool cannot be attached there or can be attached only with difficulty.

The object of the invention is, therefore, to provide a tensioning device which makes it possible to work even in those spatially confined situations where conventional tensioning devices cannot be used.

SUMMARY OF THE INVENTION

To achieve this object, a tensioning device for expanding a threaded bolt is proposed, wherein the axis of rotation of the drive shaft is arranged at an angle of more than 0° and less than 180°, preferably at an angle of 90°, to the longitudinal mid-axis of the piston.

Since the axis of rotation of the drive shaft of the gear arrangement is not arranged parallel, but instead is arranged at an angle to the longitudinal mid-axis of the piston, the nut of the screw connection can be set, for example, from a more distant position via the obliquely or transversely arranged drive shaft. Using the external drive tool, for example a hexagon spanner, therefore, in specific mounting situations the nut can be tightened or retightened from a more favourable, to be precise less confined, more easily accessible or simply more convenient position.

It is proposed, in one refinement, that the axis of rotation runs tangentially and at a distance with respect to the longitudinal mid-axis of the piston. Such an arrangement affords the advantage that the tensioning device can be used even in mounting situations where an arrangement in which the axis of rotation of the drive shaft intersects the longitudinal mid-axis of the piston is not possible or is possible only in a disadvantageous way.

Preferably, the drive shaft is provided, at its end facing away from the engagement structure, as a first toothing element and the driver element is provided, at its circumference, with a second toothing element, the first and the second toothing element being operatively connected to one another. In this context, "operative connection" means that either the toothing elements are in direct engagement with one another or the operative connection is implemented via further intermediate elements.

Preferably, the first toothing element is designed as a driving bevel wheel. A bevel wheel makes it possible in a simple and reliable way that the axes of rotation of to toothing elements which are directly in engagement with one another are arranged at an angle to one another, that is to say are not parallel.

It may be advantageous, furthermore, if a further component of the gear arrangement is a third toothing element, which is arranged between the first toothing element and the second toothing element and which is operatively connected to both of these and is thus arranged for transmitting the rotation of the drive shaft provided with the drive structure to the driver element.

In this case, it is proposed that the third toothing element be designed as a further bevel wheel which is in engagement with the driving bevel wheel. The thus resulting bevel-wheel pairing of the first and the third toothing element achieves a structurally simple deflection of the axis of rotation.

According to a further refinement, to transmit the rotation of the drive shaft to the driver element, there is arranged between the further bevel wheel and the second toothing element a fourth toothing element which is operatively connected to these and is designed as a further cylindrical wheel. This additional toothing element can be designed to be so small that it is in engagement with the second toothing element through a lateral passage orifice, provided for this purpose, in the supporting tube.

Furthermore, it is proposed that the driver element be provided with an inner polygon for slipping onto the nut.

Furthermore, it is proposed that the gear arrangement be configured to be pivotable about the axis of rotation of the driver element and/or that the gear arrangement be configured to be pivotable about the axis of rotation of the fourth toothing element. Both measures make it possible, singularly or together, to adapt the tensioning device individually to special mounting situations.

According to a further refinement, a further component of the gear arrangement is a gear housing arranged around the drive shaft and of one-part or multi-part form, the gear housing simply being fastened to the supporting tube from outside.

BRIEF DESCRIPTION OF THE DRAWINGS

Further details and advantages may be gathered from the following description of the exemplary embodiments illustrated in the drawing.

FIG. 3a shows a part section through the gear arrangement.

FIG. 3b shows an end view of the gear arrangement.

FIG. 3c shows a top view of the gear arrangement.

FIG. 4 shows a diagrammatic gearing illustration of the gear mechanism for driving the nut.

DESCRIPTION OF PREFERRED EMBODIMENTS

Figure 1:
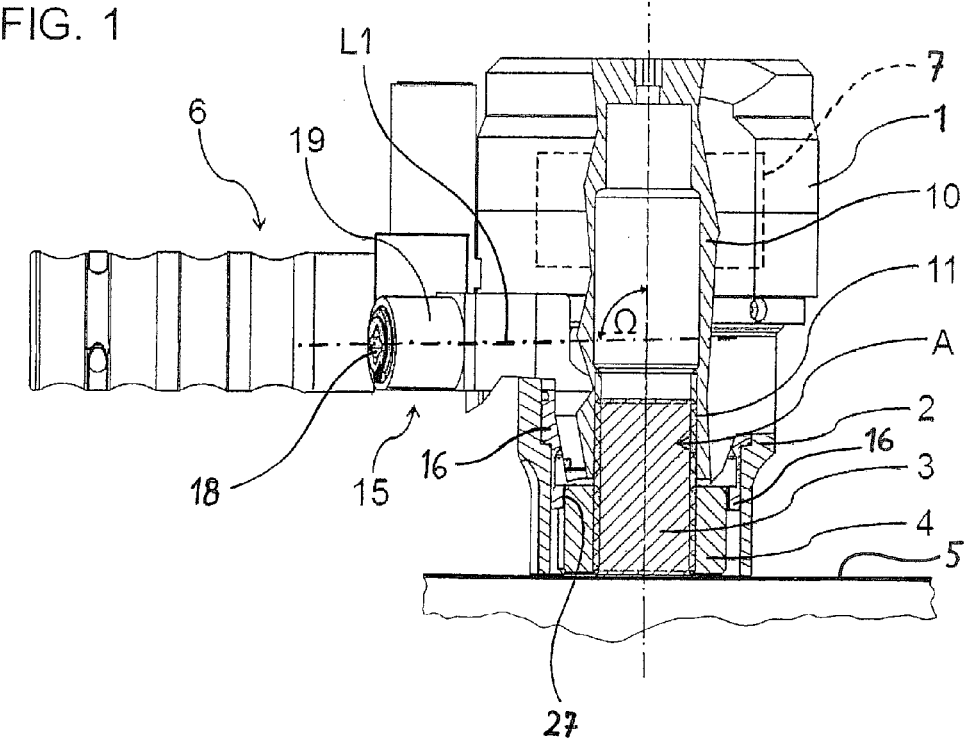
FIG. 1 shows, in a side view in which regions of the gear arrangement are reproduced sectionally along the longitudinal mid-axis, a hydraulically operating threaded-bolt tensioning device with a gear arrangement, fastened laterally to it, for setting a nut, the threaded-bolt tensioning device being placed onto a threaded bolt secured by the nut.

FIG. 1 shows a hydraulically driven tensioning device with a rigid housing 1 surrounding a hydraulic cylinder. The housing 1 is continued rigidly downwards in the longitudinal direction in a supporting tube 2 which is open on its underside and which is supported on that base 5, mostly a machine part, on which the nut 4 of a screw connection is also supported. The supporting tube 2 of the tensioning device diverts the tensioning reaction forces acting in the housing 1 to the fixed base 5. The supporting tube 2 surrounds and leaves room for the nut 4, without rotation of the nut 4 arranged inside the supporting tube 2 being obstructed.

The nut 4 is screwed onto a threaded bolt 3 of the screw connection and secures the same threaded bolt. As an element temporarily exerting a pull on the bolt 3, an interchangeable bush 10, provided with an internal thread 11, of the bolt-tensioning device is screwed onto the end portion A of that threaded portion of the threaded bolt 3 which projects beyond the nut 4. A piston 7, reproduced merely by dashes in FIG. 1, is supported against the interchangeable bush 10 from below. The piston 7 is guided longitudinally in the cylindrical inner space of the hydraulic cylinder and is sealed off with respect to this, thus delimiting the hydraulic working space of the device. When the hydraulic working space is put under tensile force via a hydraulic supply 6, hydraulic pressure is applied to the underside of the piston 7. The latter drives the interchangeable bush 10 supported on the piston 7, with the result that the threaded bolt 3 is expanded somewhat in the longitudinal direction.

One or even more piston spaces or working spaces arranged in the tensioning device can be connected to switchable high pressure via the hydraulic supply 6 located laterally on the housing 1.

Moreover, a gear arrangement 15 is provided, which operates through an orifice in the supporting tube 2, with the aid of which the nut 4 seated on the threaded bolt 3 can be rotated. This rotation is possible only when the tensioning device is operating and therefore the nut 4 is not loaded by considerable friction, particularly with respect to the base 5 and to the thread of the bolt 3.

The housing 1 may form one hydraulic cylinder 1, but also a plurality of hydraulic cylinders 1 connected consecutively in series. Here, each hydraulic cylinder 1 in each case surrounds a piston space and consequently a hydraulic working space (not illustrated in the figures). In each piston space, a piston is arranged, sealed off in relation to the inner wall of the respective housing part, so as to be movable in the longitudinal direction L. When the hydraulic supply 6 is switched on, the piston or the pistons 7 arranged therein is or are lifted by hydraulic pressure being fed into the piston space or the piston spaces. The piston 7 or, in the case of a multi-part piston, its uppermost piston is motionally coupled in the longitudinal direction L to the interchangeable bush 10 in such a way that, when the piston is lifted, an identical movement and drive of the interchangeable bush 10 occur, and consequently a torsion-free stretching of the threaded bolt 3 takes place.

The interchangeable bush 10 screwable to the end portion A of the external thread of the threaded bolt 3 is designed to be exchangeable, that is to say it can, if required, be exchanged for an interchangeable bush 10 of another size or geometry, whereas the one-part or multi-part piston 7 does not have to be exchanged for another piston.

To tension the threaded bolt 3, first the interchangeable bush 10 is screwed with its internal thread 11 onto the threaded end portion A of the threaded bolt. By hydraulic pressure subsequently being fed in, the piston 7 guided in the cylinder 1 and supported against the interchangeable bush 10 from below is lifted, at the same time driving the interchangeable bush 10, with the result that the longitudinal expansion of the threaded bolt 3 occurs. Along with this, there is a loss of friction on the underside of the nut 4, so that the latter can then be rotated, for example retightened, on the thread of the bolt 3 by means of the gear arrangement 15.

Figure 2:
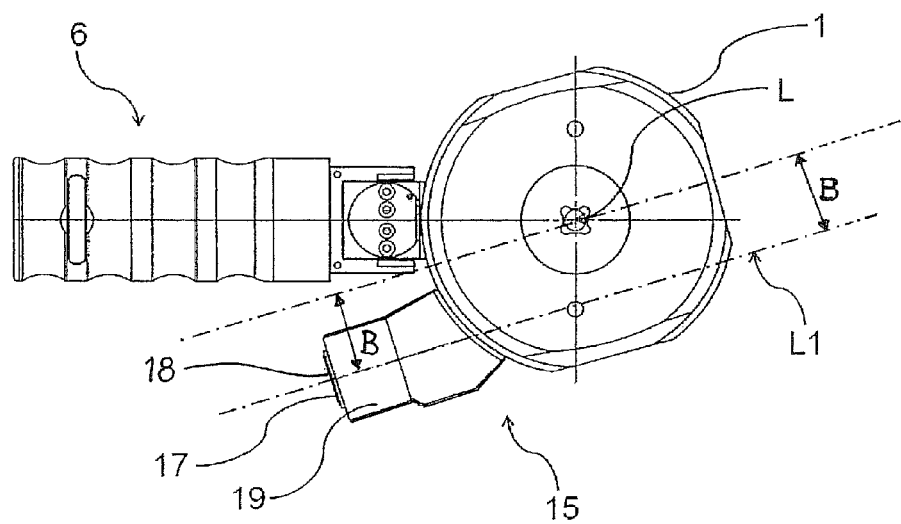
FIG. 2 shows a top view of the threaded-bolt tensioning device of FIG. 1.

It can be seen from FIG. 2 that the gear arrangement 15 is fastened laterally to the housing 1 serving as a hydraulic cylinder and/or to the supporting tube 2, in such a way that the axis of rotation L1 of a drive shaft 17, which is a component of the gear arrangement 15, does not run parallel to the longitudinal mid-axis L of the piston. As can be seen in FIG. 2 and FIG. 4, the axis of rotation L1 does not intersect the longitudinal mid-axis L. Instead, the axis of rotation L1 runs tangentially and at a distance B with respect to the longitudinal mid-axis L, that is to say there is a minimum distance B between the axes L1 and L. B is greater than zero since the axes L1 and L do not intersect one another.

FIGS. 3a to 3c show three different views of the gear arrangement 15. To set the nut 4 through the orifice 2a in the supporting tube 2, the gear arrangement 15 has overall four toothing elements 21, 22, 23, 24 which partially engage one in the other and are operatively connected to one another and of which the first toothing element 21 and third toothing element 23 can be seen in FIG. 3a and the fourth toothing element 24 can be seen in FIG. 3c. The toothing elements 21, 23 are arranged completely inside a gear housing 19 of the gear arrangement, one toothing element 24 only partially and one toothing element 22 completely outside.

The first toothing element 21 is arranged at that end of the drive shaft 17 which points into the interior of the gear housing 19 and is designed as a driving bevel wheel 21. The other end of the drive shaft 17 points out of the gear housing 19, and the drive shaft 17 is provided there with an engagement structure 18 designed as an inner polygon. An appropriate external tool, for example a hand tool, can be attached to the engagement structure 18, in order thereby to rotate the drive shaft 17 about its axis of rotation L1. The drive shaft 17 is mounted in the gear housing 19.

The first toothing element 21 designed as a driving bevel wheel is in direct meshing engagement with a third toothing element 23 which is designed as a further bevel wheel and the axis of rotation of which is tilted at 90° to the axis of rotation L1 in such a way that it is arranged parallel to the longitudinal mid-axis L of the piston. By the two bevel gearwheels 21 and 23 being paired, an angle Ω of in this case 90° is achieved. The further bevel wheel 23 is toothed in such a way that it is also suitable at the same time for engagement with a cylindrical gearwheel rotating in parallel.

A cylindrical gearwheel of this type can be seen as a fourth toothing element 24 in FIG. 3c and diagrammatically in FIG. 4. The fourth toothing element 24 projects partially out of the gear housing 19 on that side of the latter which faces away from the engagement structure 18. This projecting part of the fourth toothing element 24 designed as a cylindrical gearwheel is dimensioned such that it is in direct meshing engagement with the second toothing element 22 (FIG. 4) through the orifice 2A in the supporting tube 2.

The second toothing element 22 is designed as a cylindrical toothing on the circumference of a driver element 16 (FIG. 1, FIG. 4). The driver element 16 is located completely inside the supporting tube 2 and is arranged with a form fit around the nut 4, so that a rotation of the driver element 16 leads to an identical rotation of the nut 4. For this purpose, the driver element 16 is ring-shaped and is provided on the inside with an inner hexagon 27 which matches with the outer hexagon of the nut 3.

FIG. 4 shows diagrammatically the overall operative connection of the drive train, formed by the gear arrangement 15, for the purpose of setting the nut 4. In order to tighten the nut 4, the drive shaft 17 is set in a clockwise rotation via the tool, for example a ratchet with an external square, which matches with the engagement structure 18 and is introduced into the engagement structure 18. By means of the drive shaft 17, the driving bevel wheel 21 arranged on the latter corotates identically. The further bevel wheel 23 is in direct meshing engagement with the driving bevel wheel 21 and is therefore set in rotation about an axis of rotation tilted at 90° with respect to the axis of rotation L1, the former axis of rotation already being oriented parallel to the axis of rotation of the nut 4 and the longitudinal mid-axis L of the piston. The further bevel wheel 23 sets the second toothing element 22 of the driver element 16 in a clockwise rotation via the fourth toothing element 24, and thus also the nut 4 via the inner hexagon 27.

The specification incorporates by reference the entire disclosure of German priority document 10 2013 107 096.5 having a filing date of Jul. 5, 2013.

While specific embodiments of the invention have been shown and described in detail to illustrate the inventive principles, it will be understood that the invention may be embodied otherwise without departing from such principles.

LIST OF REFERENCE SYMBOLS

1 Housing/hydraulic cylinder
2 Supporting tube
3 Threaded bolt
4 Nut
5 Base
6 Hydraulic supply
7 Piston
10 Interchangeable bush
11 Internal thread
15 Gear arrangement
16 Driver element/inner polygon
17 Drive shaft
18 Engagement structure
19 Gear housing
21 First toothing element
22 Second toothing element
23 Third toothing element
24 Fourth toothing element
27 Inner hexagon
A Threaded end portion/end portion
B Distance
L Longitudinal mid-axis
L1 Axis of rotation
L2 Axis of rotation
Ω Angle

What is claimed is:

1. A tensioning device for expanding a threaded bolt by a pull on a threaded end portion of the threaded bolt, the tensioning device comprising:
   a supporting tube surrounding the threaded end portion and surrounding a nut screwed onto the threaded end portion;
   a cylinder arranged in a prolongation of the supporting tube;
   at least one piston disposed in the cylinder and moveable in the cylinder axially in a direction of a longitudinal mid-axis of the piston;
   a hydraulic supply operatively connectable to the at least one piston;
   an interchangeable bush adapted to be screwed to the threaded end portion and adapted to be driven axially by the at least one piston;
   a gear arrangement for adjusting the nut;
   the gear arrangement comprising a driver element adapted to engage externally on the nut and further comprising a drive shaft provided with an engagement structure for a drive tool;
   wherein an axis of rotation of the drive shaft is arranged at an angle of more than 0° and less than 180° relative to the longitudinal mid-axis of the at least one piston;
   wherein the axis of rotation extends tangentially and at a distance relative to the longitudinal mid-axis of the at least one piston.

2. The tensioning device according to claim 1, wherein the angle is 90°.

3. The tensioning device according to claim 1, wherein the drive shaft has an end facing away from the engagement structure, wherein said end of the drive shaft has a first toothing element, wherein the driver element has a circumference and the circumference is configured as a second toothing element, wherein the first and second toothing elements are operatively connected to each other.

4. The tensioning device according to claim 3, wherein the first toothing element is a driving bevel wheel.

5. The tensioning device according to claim 1, wherein the driver element is provided with an inner polygon for fitting the driver element onto the nut.

6. The tensioning device according to claim 1, wherein the gear arrangement is pivotable about the longitudinal mid-axis of the piston.

7. The tensioning device according to claim 1, wherein the gear arrangement further comprises a gear housing receiving the drive shaft, wherein the gear housing is of a one-part form or a multi-part form, and wherein the gear housing is supported against an exterior of the supporting tube.

8. A tensioning device for expanding a threaded bolt by a pull on a threaded end portion of the threaded bolt, the tensioning device comprising:
   a supporting tube surrounding the threaded end portion and surrounding a nut screwed onto the threaded end portion;
   a cylinder arranged in a prolongation of the supporting tube;
   at least one piston disposed in the cylinder and moveable in the cylinder axially in a direction of a longitudinal mid-axis of the piston;
   a hydraulic supply operatively connectable to the at least one piston;
   an interchangeable bush adapted to be screwed to the threaded end portion and adapted to be driven axially by the at least one piston;

a gear arrangement for adjusting the nut;
the gear arrangement comprising a driver element adapted to engage externally on the nut and further comprising a drive shaft provided with an engagement structure for a drive tool;
wherein an axis of rotation of the drive shaft is arranged at an angle of more than 0° and less than 180° relative to the longitudinal mid-axis of the at least one piston;
wherein the drive shaft has an end facing away from the engagement structure, wherein said end of the drive shaft has a first toothing element, wherein the driver element has a circumference and the circumference is configured as a second toothing element, wherein the first and second toothing elements are operatively connected to each other;
wherein the gear arrangement comprises a third toothing element that is arranged between the first toothing element and the second toothing element, wherein the third toothing element is operatively connected to the first toothing element and the second toothing element for transmitting a rotation of the drive shaft to the driver element.

9. The tensioning device according to claim 8, wherein the first toothing element is a driving bevel wheel and wherein the third toothing element is a bevel wheel engaging said driving bevel wheel.

10. The tensioning device according to claim 8, wherein, between the third toothing element and the second toothing element, a fourth toothing element is arranged which engages both the third toothing element and the second toothing element, wherein the fourth toothing element is a cylindrical wheel and transmits the rotation of the drive shaft to the driver element.

11. The tensioning device according to claim 10, wherein the first toothing element is a driving bevel wheel and wherein the third toothing element is a bevel wheel engaging said driving bevel wheel.

12. The tensioning device according to claim 10, wherein the gear arrangement is designed to be pivotable about an axis of rotation of the fourth toothing element.

* * * * *